Dec. 31, 1957  I. I. SIKORSKY  2,818,224
AIRFOIL CONTOUR PYLON
Filed April 20, 1955

INVENTOR
I. I. SIKORSKY
BY M. B. Tasker
ATTORNEY

United States Patent Office 2,818,224
Patented Dec. 31, 1957

2,818,224

AIRFOIL CONTOUR PYLON

Igor I. Sikorsky, Easton, Conn., assignor to United Aircraft Corporation, East Hartford, Conn., a corporation of Delaware Application April 20, 1955, Serial No. 502,681

1 Claim. (Cl. 244—17.19)

This invention relates to helicopters and more particularly to additional means to compensate for the torque generated by the sustaining rotor of a helicopter having a single main sustaining rotor.

Helicopters of this type usually have an additional rotor mounted on an axis a considerable distance from the axis of the main rotor and at right angles thereto. By varying the pitch of said additional or tail rotor, it is possible to compensate for the varying amounts of torque generated by the main rotor as the helicopter passes through various flight regimes in addition to controlling the heading of the ship.

The pitch of such a tail rotor is controlled by a pair of foot pedals, located in the pilot's compartment, which pedals work in opposition to each other. Thus, to compensate for changes of engine power or main rotor blade pitch, either or both of which result in a change of main rotor torque, it is necessary for the pilot to actuate the foot pedals.

The torque of the main rotor of a machine of this type is generally at a relatively high point when hovering, decreasing as the machine picks up slow forward speed, and increasing as forward speed increases, to reach a maximum point at maximum forward speed. At the normal cruising speed, the torque of the main rotor somewhat exceeds the torque generated in hovering, and at higher speeds, greatly exceeds it.

It is the practice to adjust the tail rotor pitch control linkages so that the pedals will be in a neutral or centered position when the helicopter is hovering. This is done so that the pilot may more accurately sense the feel and balance of the ship while hovering before commencing forward flight, and also so that full travel of the pedals will be available when hovering, at which time there is generally more need of it. By so doing, however, it is obvious that when flying at or above cruising speed, continuous control by the pilot will be necessary. While the past practice is to apply this control, it is one of the factors contributing to pilot fatigue.

This invention provides means responsive to the helicopter airspeed to assist the pilot's efforts to compensate main rotor torque. It further provides counter-torque means which are inoperative when the helicopter is hovering, and yet which become effective at the cruising and higher speeds of the aircraft. The invention would also reduce the horsepower required in flight, and would unload the tail rotor thereby reducing its flapping, which in turn would contribute toward smoother operation and lesser stresses on the tail rotor.

Other features and advantages of this invention will be apparent from the following description taken in connection with the following drawings in which.

Figure 1:
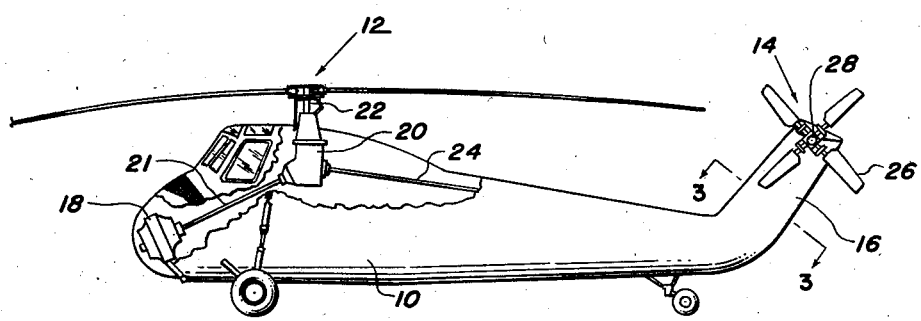
Fig. 1 is a side view of a helicopter of the type on which this invention is particularly useful.

The helicopter as shown has an extended fuselage 10, a single main sustaining rotor 12, and a torque compensating rotor 14 mounted on an upwardly extending pylon 16. Both rotors are driven at constant relative speed by an engine 18 mounted in the nose of the fuselage, which engine turns the gears in a main gear box 20 through a drive shaft 21. Main rotor drive shaft 22 and tail rotor drive shaft 24 extend from gear box 20 to turn their respective rotors.

It has been found necessary to construct the fuselage aft of the main rotor in the general shape as shown in Fig. 1 in order to provide adequate clearance for the main rotor blade flapping which occurs in severe maneuvers. It has also been found necessary to suspend the tail rotor a considerable distance above the ground to minimize the personnel hazard and to prevent the tail rotor blades from striking the ground when making a fast landing. To this end, a machine of this type is usually provided with a pylon such as the upwardly extending pylon 16 to support the tail rotor high above the ground. The tail rotor, which consists of the usual variable pitch rotor blades 26 which are rotatable about a generally horizontal shaft 28, produces thrust in varying amounts depending upon its speed of rotation and the pitch of its blades to offset the main rotor torque.

Figure 3:
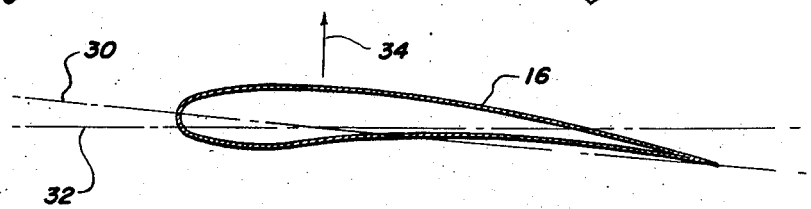
Fig. 3 is an enlarged section through the tail pylon of the helicopter on line 3—3 of Fig. 1.

In accordance with this invention the pylon 16 is formed of airfoil cross section, as shown in Fig. 3, and has its sectional zero-lift line 30 inclined with respect to the longitudinal center line 32 of the fuselage 10 in a direction to produce a thrust force 34 as indicated in this figure. Also, the pylon 16 is preferably directed somewhat aft so that it terminates well below the plane of rotation of the main rotor in forward flight of the helicopter and is not influenced by the main rotor during hovering.

Figure 2:
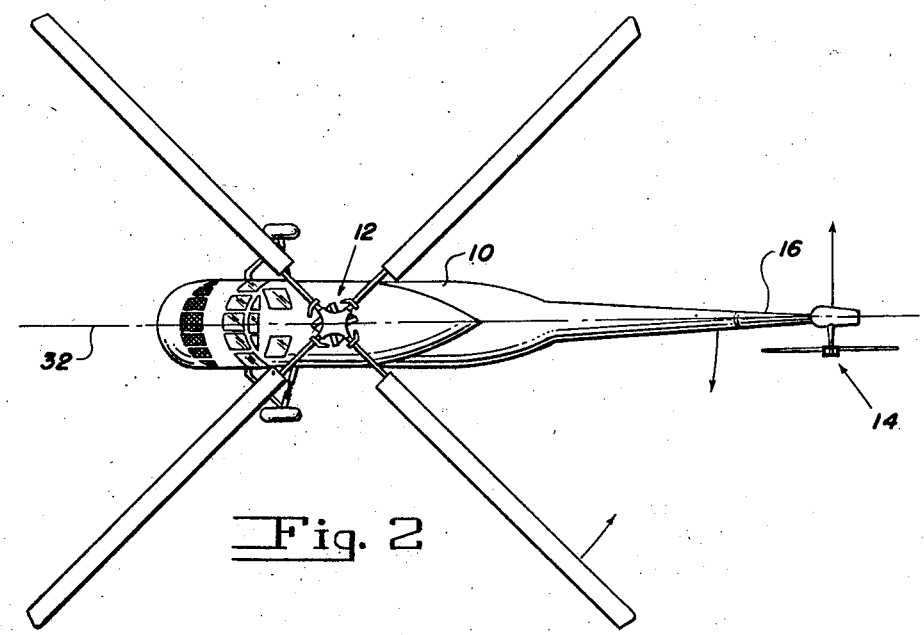
Fig. 2 is a top view of the helicopter of Fig. 1.

The main rotor 12 of the helicopter rotates counterclockwise as viewed in Fig. 2, thus setting up a reaction in the fuselage tending to turn it clockwise about the main rotor drive shaft. The tail rotor 14 has the pitch of its blades adjusted to produce a thrust which reacts upon the fuselage 10 to rotate the latter counterclockwise in varying amounts as the pilot uses his pedals to control the direction of the helicopter and also to correct for the main rotor torque.

In hovering the helicopter there is a negligible amount of down draft from the main rotor which passes over the pylon 16 as there is no forward speed and the airfoil shaped pylon produces no thrust. As forward speed increases, however, an increasing amount of air will pass over the pylon surfaces due to the forward movement of the helicopter, generating an increasing amount of thrust complementary to the tail rotor thrust.

It can be seen that as forward speed increases to cruising speed and faster, a sufficient thrust will be generated by the pylon to relieve the tail rotor of a substantial amount of the torque compensating load. By providing sufficient camber to the pylon the amount of thrust generated thereby when added to the thrust generated by the tail rotor with the pedals in a centered position can be made to equal the torque generated by the main rotor at a selected forward flight speed.

As a result the pilot's pedals can remain substantially centered, relieving the pilot of the strain and fatigue resulting from maintaining constant pressure on one of the pedals.

A further result of the invention is to obtain generally better flying characteristics and to extend the life of the tail rotor by reducing the work load thereon.

While only one embodiment of the invention has been shown for purposes of illustration, it will be evident that various changes in the construction and arrangement of

I claim:

In a helicopter having an extended fuselage and a main sustaining rotor, an upwardly extending pylon at one extremity of said fuselage, a countertorque rotor mounted on said pylon, and drive means for operating said main sustaining rotor and countertorque rotor, said pylon being of airfoil cross section and having its chordline located generally parallel with a vertical plane including the longitudinal axis of said fuselage with its lift camber located to produce a thrust complemental to the thrust reaction of said tail rotor, the chordline of said pylon being of substantially constant length throughout.

References Cited in the file of this patent

UNITED STATES PATENTS

| | | |
|---|---|---|
| 1,977,724 | Hays | Oct. 23, 1934 |
| 2,369,652 | Avery | Feb. 20, 1945 |
| 2,381,968 | Bossi | Aug. 14, 1945 |
| 2,415,622 | Bossi | Feb. 11, 1947 |
| 2,420,823 | Hays | May 20, 1947 |
| 2,630,985 | Sherry | Mar. 10, 1953 |